United States Patent [19]

Salomon

[11] 4,335,093

[45] Jun. 15, 1982

[54] PROCESS OF CONVERTING WIND ENERGY TO ELEMENTAL HYDROGEN AND APPARATUS THEREFOR

[75] Inventor: Robert E. Salomon, Dresher, Pa.

[73] Assignee: Temple University, Philadelphia, Pa.

[21] Appl. No.: 198,449

[22] Filed: Oct. 20, 1980

[51] Int. Cl.³ .............................................. F03B 13/00
[52] U.S. Cl. ..................................... 423/644; 290/43; 290/54; 114/102; 422/187; 422/211
[58] Field of Search ...................... 290/43, 44, 54, 55; 415/1, 7, 8; 416/1, 54, 55, 85; 114/102, 103; 423/644; 204/129; 422/187, 211

[56] References Cited

U.S. PATENT DOCUMENTS

| | | | |
|---|---|---|---|
| 3,238,911 | 3/1966 | Pazulski | 290/43 X |
| 3,986,787 | 10/1976 | Mouton, Jr. et al. | 290/54 X |
| 4,102,291 | 7/1978 | Sebald | 290/54 X |
| 4,184,084 | 1/1980 | Crehore | 290/55 |

*Primary Examiner*—J. V. Truhe
*Assistant Examiner*—W. E. Duncanson, Jr.

*Attorney, Agent, or Firm*—Paul & Paul

[57] ABSTRACT

A system is described for the conversion of the energy in the wind over oceanic regions into hydrogen which can be used as a supplement to or replacement for fossil fuels. The system is based on the use of modified sailing vessels which serve as water electrolysis plants. In operation, the wind propels the vessel through the water in the manner common to all sailing vessels except that the vessel in this system does not carry a mast and does not need the ballasting characteristic of conventional sailcraft. The propulsion of the vessel causes an immersed screw propeller to power an electromagnetic generator, the electric current from which electrolytically decomposes water into hydrogen and oxygen. The hydrogen is stored on board the vessel by allowing it to combine with suitable metal alloys such as the Fe-Ti alloys to form a hydride. The metal alloy hydride is stored in cannisters which are allowed to desorb their hydrogen at sea for use as a fuel source, or alternatively may be discharged ashore through pipelines at suitable intervals.

8 Claims, 6 Drawing Figures

PROCESS OF CONVERTING WIND ENERGY TO ELEMENTAL HYDROGEN AND APPARATUS THEREFOR

BRIEF SUMMARY OF THE INVENTION

The onboard generation of electricity on sailcraft through the use of propellers coupled to small generators is known, i.e. U.S. Pat. Nos. 3,619,632; 4,102,291. Such devices are used normally for battery charging and create insignificant drag on the vessel. However, the generation of significant power by means of sail propulsion requires the generation of maximum power through the use of a maximum amount of sail. With traditional sailing craft there is a very close correlation between the amount of sail carried and the length of the vessel, and as the length of the vessel increases the capital cost rises rapidly. In order to generate one Megawatt of power in a 20 knot wind, a traditional sailing vessel would require the dimensions of a supertanker, thereby militating very strongly against commercialization. A sailing vessel can naturally produce power on any course of sail, and it is known that the beam reach is the most efficient point of sail for a fore and aft rigged vessel, since this rig allows for independent operation of the sails without blanketing, and since in this manner the vessel may be sailed back and forth over a designated route allowing operators the option of being able to return to their point of departure. However, a vessel sailing a beam reach must be extensively ballasted and structurally designed to resist the tensile and compressive stresses produced by the rigging and masts thereof. It is accordingly necessary that the system in accordance with the process and apparatus of this invention utilize a vessel which will only be operated under sail power on the downwind run or broad reach. The downwind run, in which the sail essentially pulls the vessel through the water is the typical mode of operation.

On the downwind run, a vessel having its sail positioned well ahead of the hull, does not tend to heel as does a normal sailcraft, permitting a simplification of hull design. However, the amount of sail that can be carried with traditional rigging is limited since with many masts one sail blankets another on the downwind course. It is known that one can extract approximately one kilowatt of power for every one hundred square feet of sail in a 20 knot wind on a downwind run. Since one Megawatt of power generation (in a 20 knot wind) would achieve the minimum acceptable power source at the present time and for the near future, a 75 foot L.O.A. (length overall) vessel would require the deployment of approximately 100,000 ft$^2$ of sail. In accordance with the apparatus of this invention, such deployment of sail is made possible by the use of a triangular shaped sail which is held aloft while tethered to the vessel by means of one or more lighter than air balloons. Such balloons are described for use in other application in U.S. Pat. Nos. 3,270,895 and 4,084,102. The preferred shape of sail is that of an equilateral spherical triangle. Such sail is supported at its upper most vertex by the lighter than air balloon. Three tether lines are used to secure the three vertices of the triangular shaped sail to the electrolysis vessel. Preferably these tether lines are wound on swiveling drums operating off power winches to control these tether lines and therefore the position of the sail in the air. It will be apparent that no customary masts would be mounted on these vessel for mounting the sail. In downwind operation, which is the only time during which the sail is lofted in accordance with the process of this invention, the two lowermost tether lines are provided with buoyant means at a location between the vessel and the foot of the sail. This buoyant means may be formed of the tether line itself or may include additional buoyant material, however said means serves to automatically regulate the vertical position of the sail over the sea. If the sail tends to ascend due to a wind gust, the out of the water weight of these lines pulls the sail down towards the surface, while if the sail tends to fall, the buoyant lines by entering the water allow the wind to stabilize the sail's position. The friction of the tether lines moving through the water also helps to stabilize the sail shape against inadvertent fluctuations. The upper tether line is used for sail shaping and to prevent the wind force on the sail from forcing the top of the sail forward. The tension in this line contains a downward component of force which is compensated for by the lighter than air balloon. The magnitude of this downward component can be reduced by increasing the length of the tether line although the weight of this line is a factor in actual design. The weight of all three tether lines helps to absorb sudden wind shocks to the sail and to the vessel and thereby prolongs sail life.

To deploy the sail of the apparatus of this invention, the lighter than air balloon is inflated with some pre-stored hydrogen and the filled balloon lifts the sail from a sail locker formed conveniently in the forward part of the vessel. Since the vessel is oriented downwind for energy conversion, the sail takes shape in the manner of a spinnaker and is positioned in front of the vessel by easing and tightening the individual tether lines. On its downwind course, the electrolysis vessel itself can be steered at some angle to the wind (a broad reach) without reducing the power available for energy conversion. It will readily be apparent to those skilled in sailmaking that the nature and design of the sail and the material from which it is made must be adapted to the total forces to be expected in this system. Obviously with heavier sail cloth, the size of the lighter than air balloon must be increased. The ultimate size of the balloon is practically limited by safety and initial fill-up considerations.

The wind energy which is converted into the speed of the vessel downwind is recovered in accordance with the process and apparatus of this invention by an oversize highspeed driven propeller. The propeller shaft would be in turn coupled by a gear box and transmission to a D.C. generator. Torque may be controlled by means of field coil current, which can be automatically varied in a predetermined manner using known circuitry. (D. Nightingale et al., Alternate Sources of Energy, 24, 15 February, 1977) Optimum torque in the system described and claimed herein is that sufficient to reduce the hull speed to one-third of the true wind speed.

The electricity produced by the on board generator in the apparatus of this invention is used to decompose water using commercially available equipment, thereby generating hydrogen and oxygen. The hydrogen, a fuel, may be stored under pressure and refrigeration, but more preferably is stored in solid metal hydride form in accordance with known systems. (J. J. Reilly et al., BNL- 18887, NTIS). Since the vessel of the apparatus of this invention is of the displacement type, the weight of the alloy metal used for hydride preparation is of no concern. Elemental hydrogen in metal hydride form is safe and compatible with the direct production by electrolysis. Such storage units would practically require on the order of 10 ft.$^3$ of space per each 24 hour conversion operating at a power of 1.0 Megawatts. Seawater may obviously be utilized for electrolysis after first removing impurities with a conventional distillation means.

In order to position the vessel in accordance with the apparatus of this invention for its downwind run to carry out the process of this invention, the vessel must contain an auxiliary engine. While this engine may be conventionally fueled, optimally it is fueled by hydrogen.

DESCRIPTION OF THE PREFERRED EMBODIMENT

The apparatus of this invention is shown in the accompanying drawings, wherein.

Figure 1:
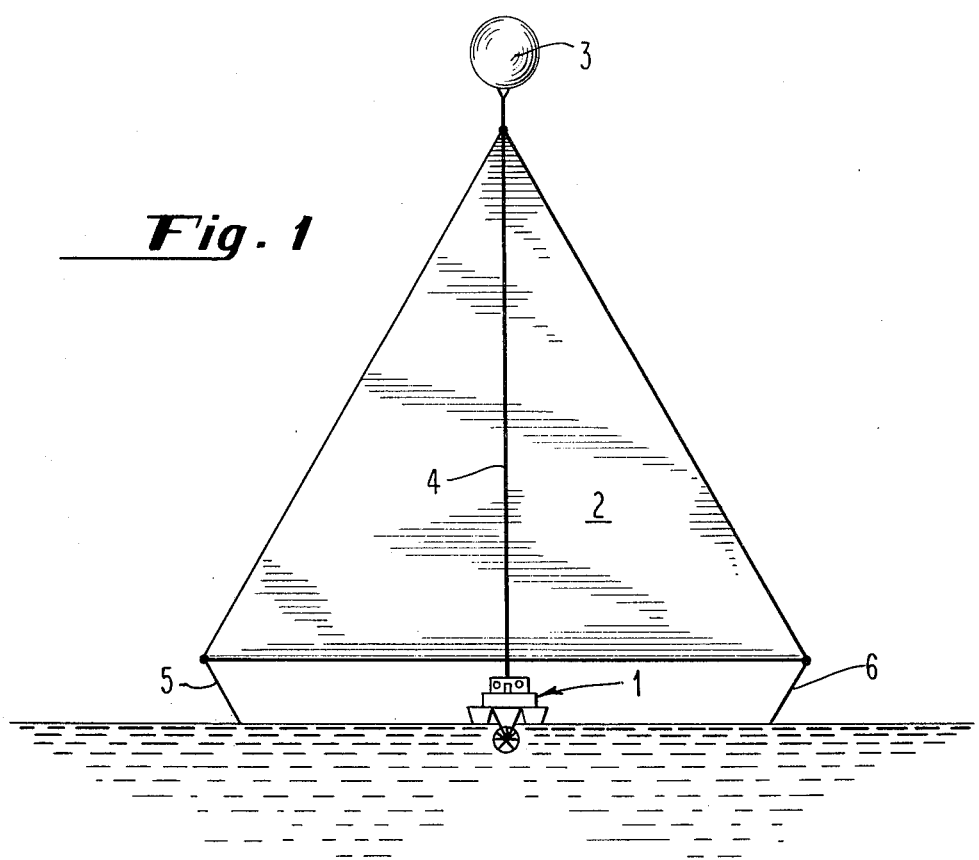
FIG. 1 is a front view of the apparatus underway at sea.
Figure 2:
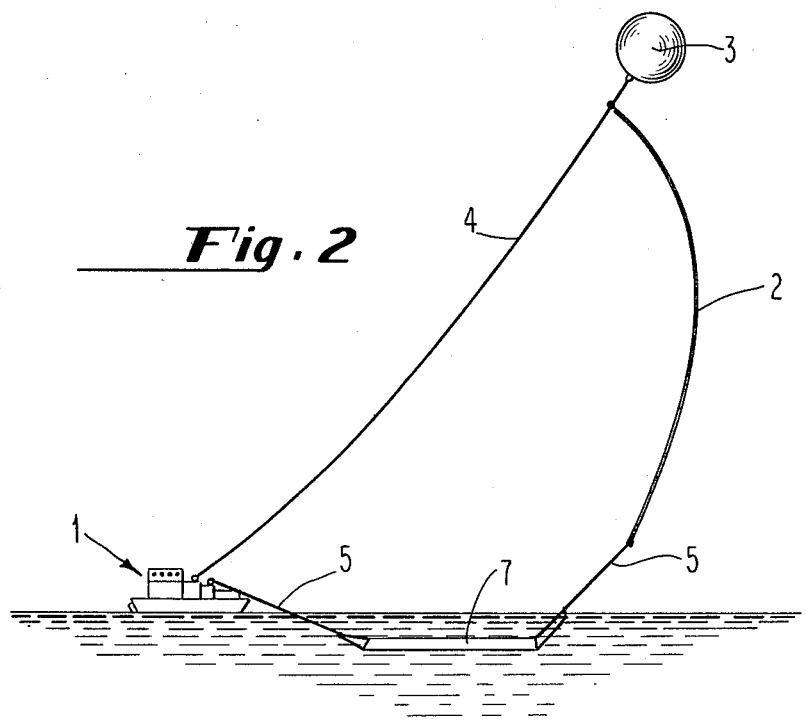
FIG. 2 is a side view of the apparatus of FIG. 1.
Figure 3:
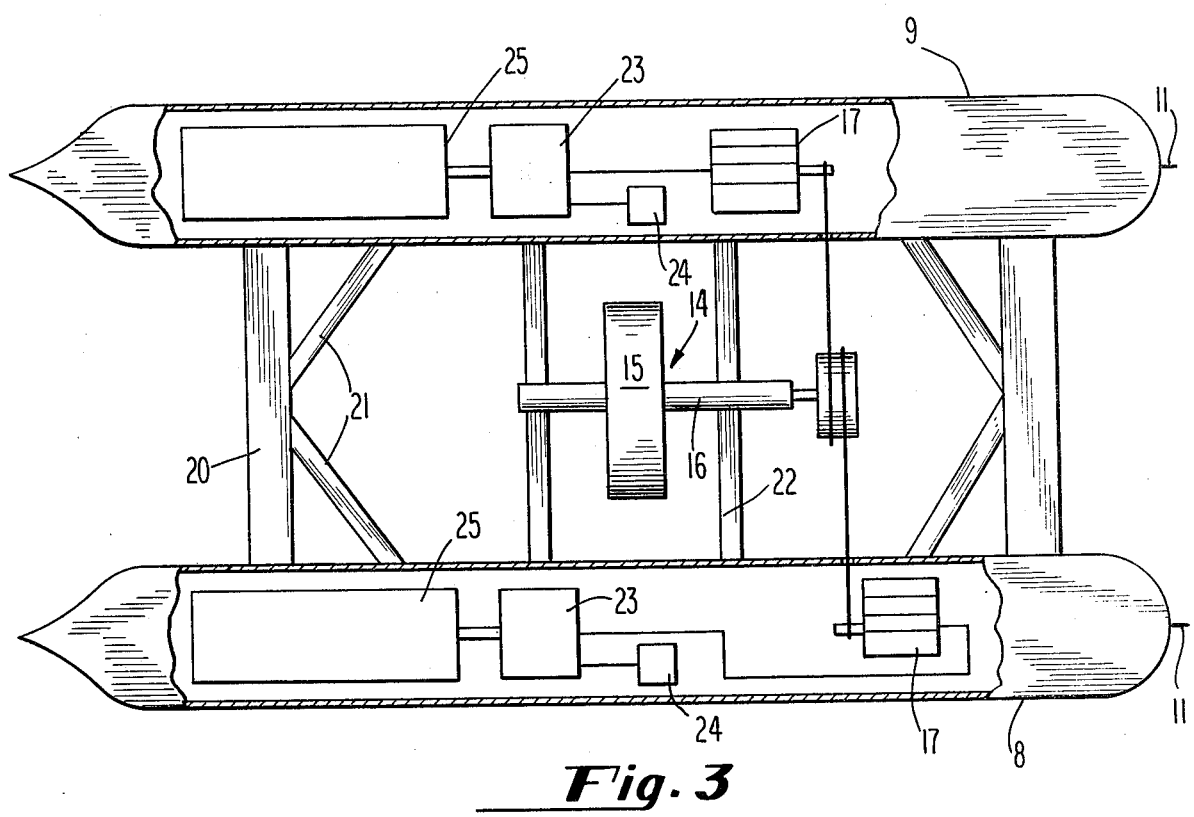
FIG. 3 is a schematic top plan view of a preferred embodiment of the apparatus of this invention, parts being broken away.
Figure 4:
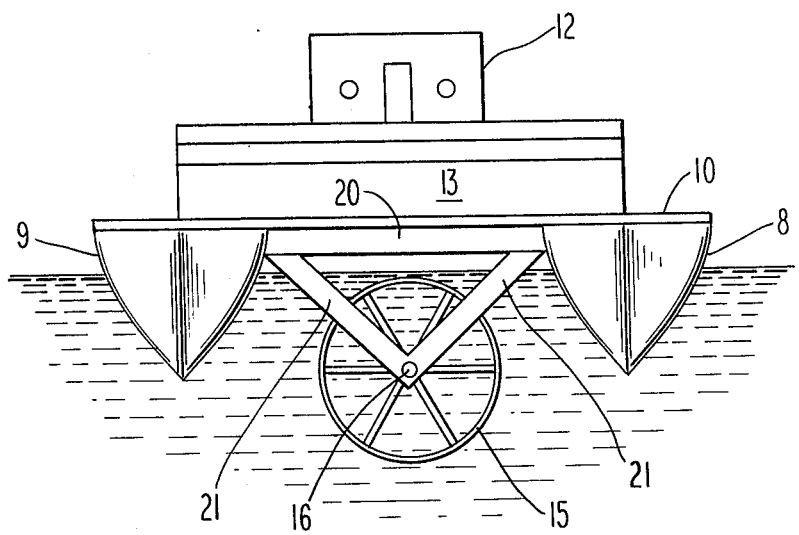
FIG. 4 is an enlarged view of a portion of the apparatus shown in FIG. 1.
Figure 5:
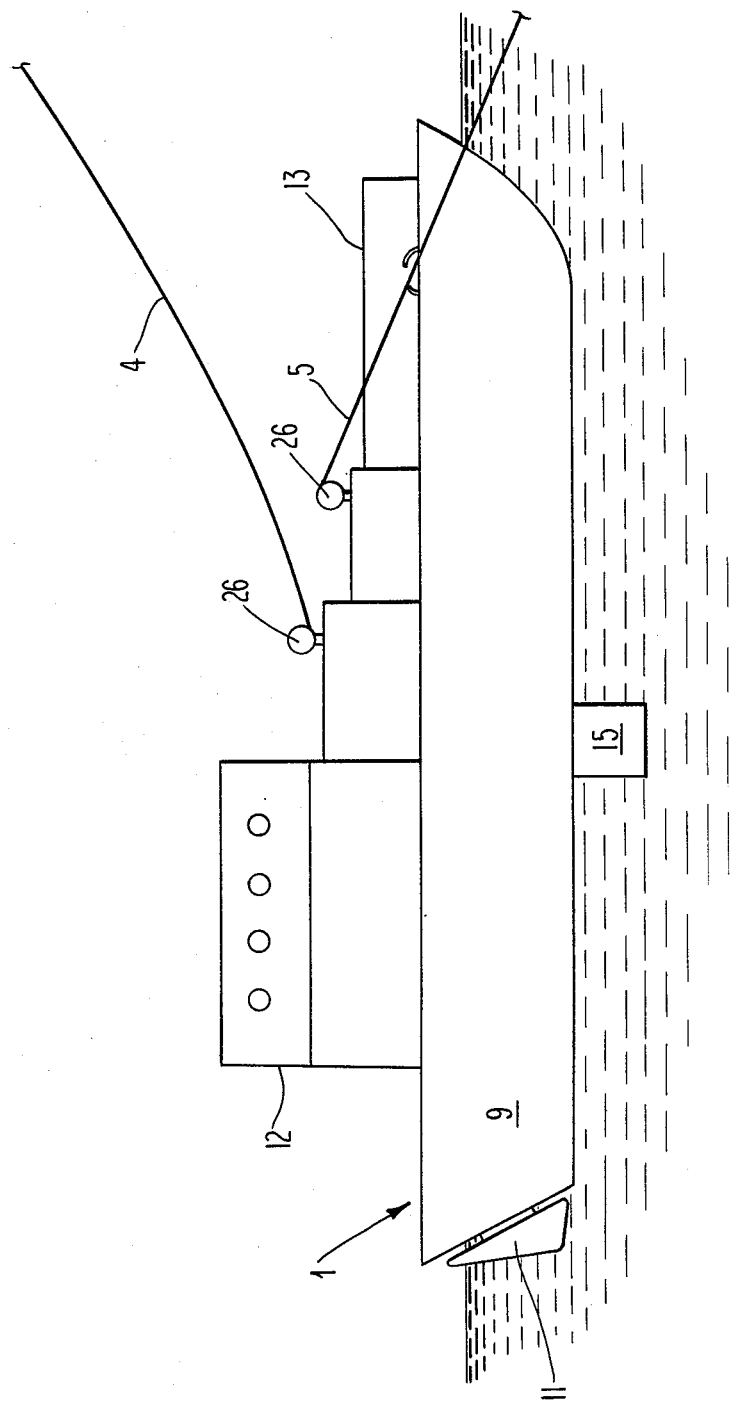
FIG. 5 is an enlarged side view of a portion of the apparatus shown in FIG. 1.

Referring now to FIGS. 1 and 2, the apparatus of this invention is shown comprising an electrolysis vessel 1. As shown this vessel 1 is preferably of the twin-hulled catamaran type. As shown, vessel 1 is underway and is being drawn downwind by the effect of triangular sail 2, which is held aloft by a lighter than air balloon 3 and is secured to the vessel 1 by upper tether line 4, starboard lower tether line 5 and port lower tether line 6. Starboard lower tether line 5 contains an enlarged buoyant medial portion 7, which together with a comparable portion contained in port lower tether line 6, enable the tether lines 5 and 6 to automatically regulate the vertical position of the sail over the sea. Electrolysis vessel 1 is shown in greater detail in FIGS. 3, 4 and 5 consisting of port hull 8, starboard hull 9, deck 10, rudders 11, control room 12, sail locker 13 and propeller driven turbine 14. The turbine 14 consists of an oversize high speed propeller 15 mounted on shaft 16 and connected in driving relationship to a pair of D.C. generators 17, 17 by means of transmission 18 and drive means 19, 19. Supports 20, 21 and 22 rigidify the vessel 1 and support the turbine 14. Drive means 19 turns the D.C. generators 17, which provide electrical output to electrolysers 23, which have been provide with water by distillation desalinators 24, 24. The hydrogen generated conventionally by electrolysers 23 is fed to hydride storage canisters 25. Tether lines 4, 5 and 6 are eased and retracted by swiveling drum power winches 26. Not shown in the drawings are the necessary conventional valves, pumps and compressors for handling the hydrogen gas.

Figure 6:
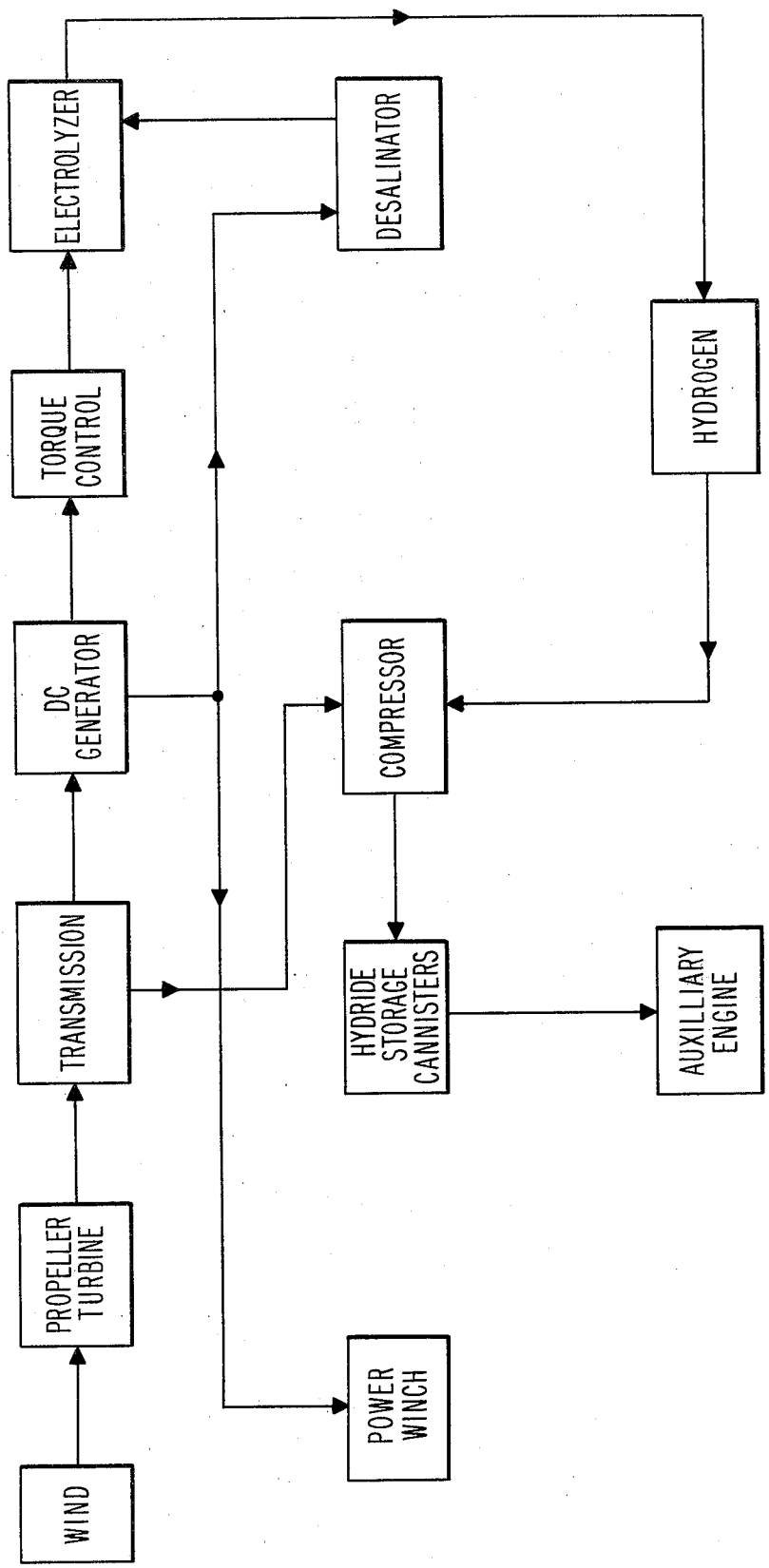
FIG. 6 is a block diagram of the general system of the apparatus of this invention.

The process of this invention is generally shown in the block diagram of FIG. 6, and is effected when the wind driving vessel 1 on a downwind course extracts mechanical energy by activating the turbine 14. This mechanical energy is caused to drive D.C. generators 17 through a transmission 18, which likewise drives a compressor for the hydrogen gas product. The generators 17 are provided with torque control and their electrical output energizes the electrolysers 23 whereupon hydrogen gas is produced. After compression, the hydrogen is absorbed in the hydride storage canisters by an iron-titanium alloy which is contained by the canisters. Portside facilities are provided for offloading the stored hydrogen at necessary intervals, including pipelines and electrical heating means to maintain the endothermic reaction of hydrogen desorbtion from the hydride. At sea, some desorbed hydrogen may be used to fuel an auxiliary engine which is necessary when the electrolysis vessel is not sailing downwind.

The apparatus and process of this invention bear similarities to windmill generation of electricity, but are obviously alternative to windmill use over the large oceanic regions of the globe where the extreme depths preclude fixed or moored structures. The results obtained by the apparatus and process of this invention are surprising and unexpected in view of the fact that a recent publication states that over the open ocean, "wind energy extraction may not occur." (M. R. Gustavson, Science 204, 13 [1979]).

Comparing sailcraft generation of electricity with windmill generation of comparable power suggests lower capital costs for sailcraft in view of the flexibility of operation inherent in the use of sails which can be raised, lowered or reefed to deal with the various wind conditions likely to be encountered. Expensive towers as used for windmills are not required, and although the blades on some windmills can be feathered, they and the bulky generator connected thereto must be designed to withstand the full blast of any passing storm. Furthermore, the wind over the ocean is generally stronger and steadier than land winds and the vessel can be made to follow a course that allows optimum thrust from the sails, since ocean winds are not blocked by natural or man made obstacles. Moreover, vessels constructed in accordance with the apparatus of this invention can be brought to drydocks and repair yards for necessary maintenance and repair while windmills located in inaccessible areas such as mountain tops require expensive repair functions.

While the preferred embodiment of the apparatus of this invention has been designed to develop optimum power in a 20 knot wind, it will readily be apparent that vessels may be similarly designed within the scope of the apparatus and process of this invention to take advantage of higher wind speeds since the power available from wind increases as the cube of the wind velocity.

Having thus described my invention, I claim:

1. An apparatus for converting wind energy to elemental hydrogen comprising incombination, an ocean going vessel, water driven propeller means fixedly mounted below the waterline and outboard of the hull of said vessel, D.C. electrical generating means carried upon said vessel, linkage means connecting said water driven propeller means in driving relationship to said generator means, water electrolysis means carried upon said vessel, electrical connecting means adapted to supply said electrolysis means with the output of said generating means, metal alloy storage means carried upon said vessel, a hydride forming metal alloy contained in said storage means, conduit means adapted to collect the hydrogen output of said electrolysis means and to deliver said output to said metal alloy storage means, gas compression means positioned within said conduit, a sail carried by said vessel, tether lines adapted to be attached to said sail, power winch means carried upon said vessel adapted to mechanically ease and retract said tether lines when said sail is aloft and attached to said tether lines, a lighter than air balloon having a lifting capacity sufficient to carry said sail aloft, attached to said sail.

2. An apparatus for converting wind energy to elemental hydrogen comprising in combination, an ocean going vessel, water driven propeller means fixedly mounted below the waterline and outboard of the hull of said vessel, D.C. electrical generating means carried upon said vessel, linkage means connecting said water driven propeller means in driving relationship to said generator means, water electrolysis means carried upon said vessel, electrical connecting means adapted to supply said hydrolysis means with the output of said generating means, metal alloy storage means carried upon said vessel, a hydride forming metal alloy contained in said storage means, conduit means adapted to collect the hydrogen output of said electrolysis means and to deliver said output to said metal alloy storage means, gas compression means positioned within said conduit, a triangular sail carried by said vessel, three tether lines adapted to be attached singly to each vertex of said triangular sail, separate power winch means carried upon said vessel adapted to mechanically ease and retract said tether lines when said sail is aloft and attached to said tether lines, a lighter than air balloon having a lifting capacity sufficient to carry said sail aloft, attached to a vertex of said sail.

3. Apparatus in accordance with claim 2, wherein the sail, tether lines balloon and power winch means are so oriented that when the vessel is under sail, one vertex of the triangular sail is held aloft uppermost by said balloon and the edge of the sail mediate said other vertices forms a foot of the sail generally horizontal to sea level.

4. An apparatus in accordance with claim 1, including a sail locker formed in the deck of the vessel and adapted to store said sail when not in use and adapted to allow said sail to be lofted freely by said balloon.

5. An apparatus in accordance with claim 1, wherein said vessel is a catamaran and said water driven propeller means is supported by structure affixed to spaced hulls of the vessel medially thereof.

6. An apparatus in accordance with claim 5 wherein the propeller means is mounted on a shaft which provides rotary motion to the linkage means for driving said generator means.

7. Apparatus in accordance with claim 1 wherein a tether line attached to the foot of said sail is provided with supplemental buoyant means adapted to increase the downward strain on the sail when said tether line is free of the water.

8. A process for the conversion of wind energy to elemental hydrogen comprising the steps of (1) propelling a sailing vessel upon the ocean continuously on a downwind course by means of the wind, (2) during said downwind course operating a D.C. generator situate upon said vessel by means of mechanical power generated by outboard propeller means affixed to said vessel (3) conducting the electrical output of said D.C. generator to a water electrolysis means situate upon said vessel whereby elemental hydrogen is produced, (4) collecting the elemental hydrogen produced by step (3), and (5) storing said elemental hydrogen on board said vessel in the form of an alloy metal hydride.

* * * * *